United States Patent [19]

Gay

[11] 4,142,273
[45] Mar. 6, 1979

[54] STUFFING HORN CONSTRUCTION FOR SAUSAGE MAKING MACHINE

[75] Inventor: Robert W. Gay, Cary, N.C.

[73] Assignee: Rheem Manufacturing Company, New York, N.Y.

[21] Appl. No.: 848,633

[22] Filed: Nov. 4, 1977

[51] Int. Cl.² ............................................. A22C 11/02
[52] U.S. Cl. ........................................................ 17/41
[58] Field of Search .............................. 17/41, 33, 35

[56] References Cited

U.S. PATENT DOCUMENTS

| | | | |
|---|---|---|---|
| 3,659,317 | 5/1972 | Kupcikevicius | 17/41 X |
| 3,703,064 | 11/1972 | Lugiewicz | 17/41X |
| 3,964,236 | 6/1976 | Smith | 17/41 X |
| 4,017,941 | 4/1977 | Raudys et al. | 17/41 |
| 4,023,238 | 5/1977 | Phares | 17/41 |

FOREIGN PATENT DOCUMENTS 24363  12/1950  Finland ........................................ 17/41

Primary Examiner—Willie G. Abercrombie
Attorney, Agent, or Firm—Allegretti, Newitt, Witcoff & McAndrews

[57] ABSTRACT

An improved stuffing horn assembly for a sausage machine includes a center, manifold tube with a rotatable and translatable outer tube mounted thereon. Four branch tubes extend from the outer tube and are positionable by indexing means to provide a pathway for the sausage from the manifold tube through the outer tube and then through one of the four branch tubes. Means are provided for indexing the outer tube and connected branch tubes both longitudinally and rotatably.

10 Claims, 8 Drawing Figures

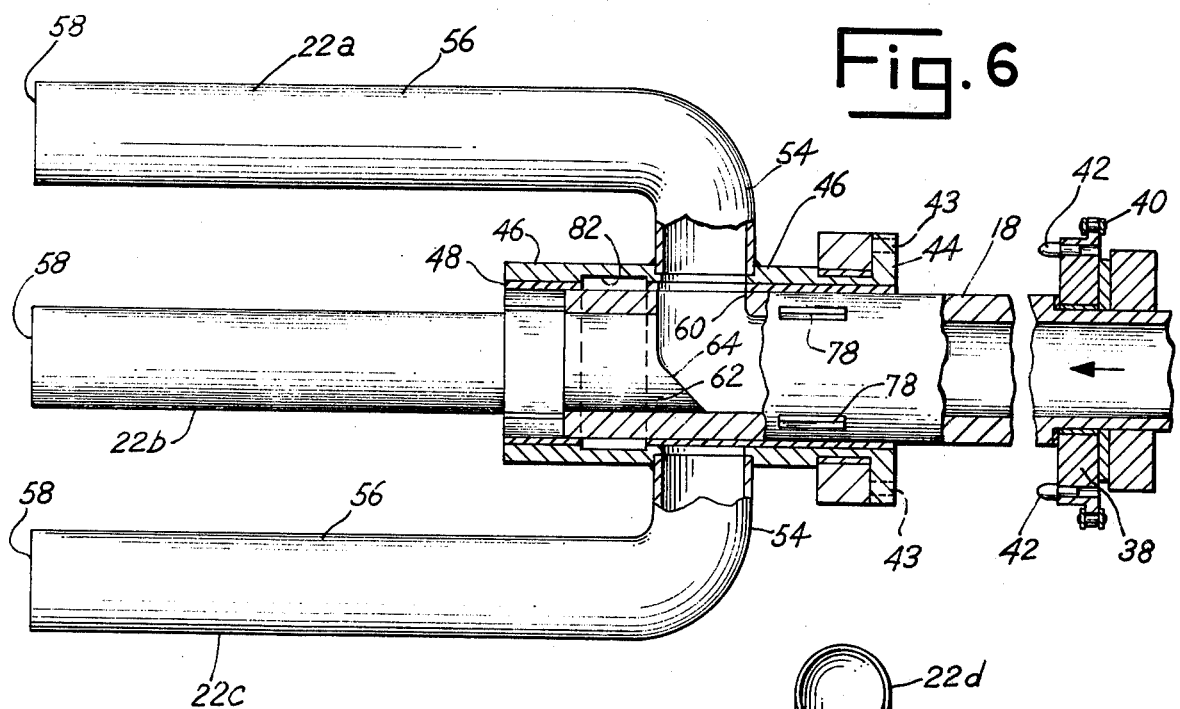
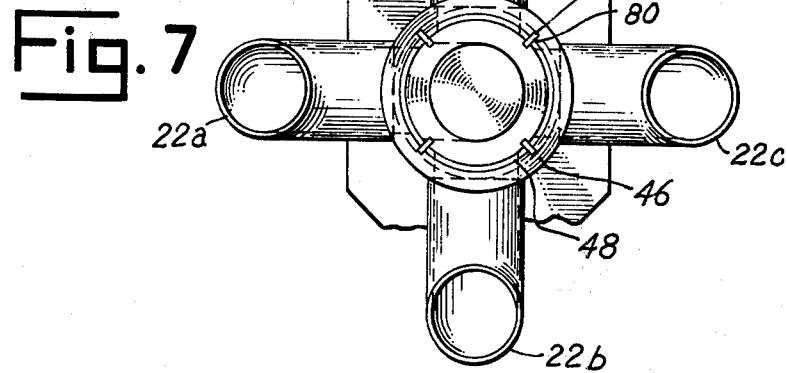
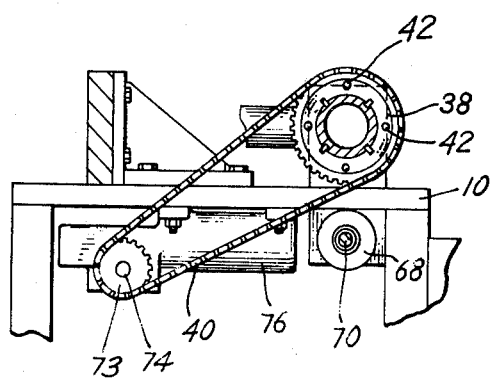

STUFFING HORN CONSTRUCTION FOR SAUSAGE MAKING MACHINE

BACKGROUND OF THE INVENTION

This invention relates to an improved stuffing horn assembly for food processing equipment and more particularly to an improved stuffing horn assembly for use in combination with a sausage making machine.

Use of a stuffing horn assembly in combination with a sausage making machine for facilitating manufacture of sausage is disclosed in various prior art patents including U.S. Pat. No. 4,023,238, Stuffing Machine with Telescoping Nozzle owned by Rheem Manufacturing Company, the assignee of the present application. U.S. Pat. No. 4,023,238 is incorporated herewith by reference.

Previously, during manufacture of sausage, sheared casing material is applied over the end of a sausage stuffing horn. The end of the casing is sealed. Sausage material is then discharged through the horn into the casing material and the ends of the casing are clipped to form the completed sausage. U.S. Pat. No. 4,023,238 disclosed a sausage stuffing horn with the additional feature of a telescoping nozzle which may be adjusted to facilitate filling and sealing the ends of the casing in order to improve the quality of the final sausage product.

The apparatus disclosed in U.S. Pat. No. 4,023,238 works well in its intended environment. However, when the supply of sheared casing has been depleted from the end of a stuffing horn of the type shown in U.S. Pat. No. 4,023,238, various mechanisms must be removed or displaced in order to insert new sheared casing material over the end of the horn. This limits the productivity of the equipment.

To overcome this disadvantage, sausage machines have been made which include a plurality of horns attached to a single platen. The platen may be rotated to align one of the horns with a sausage discharge outlet of a sausage machine. Simultaneously, sheared casing material is placed on the other horns. Upon depletion of casing from the horn associated with the sausage machine discharge, the platen is rotated to position a different horn with sheared casing material in front of the sausage machine discharge outlet.

The prior art platen device also operates well but does not include a telescoping horn assembly. Complexities associated with providing a horn of the type shown in U.S. Pat. No. 4,023,238 for each of the separate horns associated with the platen device apparently prevent successful and economic manufacture of such a device.

The present invention provides a mechanism which incorporates the benefits of a sausage stuffing horn assembly having a plurality of separate stuffing horns while simultaneously incorporating the benefits associated with a telescoping horn assembly of the type shown in U.S. Pat. No. 4,023,238. The structure of the present invention seeks to provide a synergistic effect permitting improved control of indexing of the horns associated with the assembly while simultaneously providing improved control over the meat pump components of the sausage stuffing machine.

SUMMARY OF THE INVENTION

Briefly, the present invention comprises a center or inner manifold tube having open end for connection with a sausage machine and a lateral discharge opening adjacent the opposite end of the inner tube. An outer tube is telescopically and rotatably positioned on the inner tube. At least two and preferably four branch tubes define separate passageways through the outer tube. A mechanism is provided for rotatably and longitudinally indexing the outer tube and attached branch tubes with respect to the lateral discharge opening of the inner tube.

It is thus an object of the present invention to provide an improved sausage stuffing horn assembly.

It is a further object of the present invention to provide a stuffing horn assembly which includes a plurality of separate horns connected to a main discharge tube and an indexing mechanism for sequentially connecting separate horns to the main sausage discharge tube.

A further object of the present invention is to provide a sausage stuffing horn assembly which is both telescopic and rotatable so as to properly index one of a plurality of sausage discharge horns of the assembly.

Still another object of the present invention is to provide a sausage stuffing horn assembly having a minimum number of mechanical parts, which is economical to use, reliable, easy to service and maintain.

These and other objects, advantages and features of the invention will be set forth in the detailed description which follows.

BRIEF DESCRIPTION OF THE DRAWING

In the detailed description that follows, reference will be made to the drawing comprised of the following figures:

FIG. 6 is an enlarged cross-sectional view of the stuffing horn shown in FIG. 5;

FIG. 7 is an end view of the stuffing horn shown in FIG. 6; and

FIG. 8 is a cross-sectional view of the rotational indexing mechanism shown or taken along the line 8—8 in FIG. 5.

DESCRIPTION OF THE PREFERRED EMBODIMENT

Figure 1:
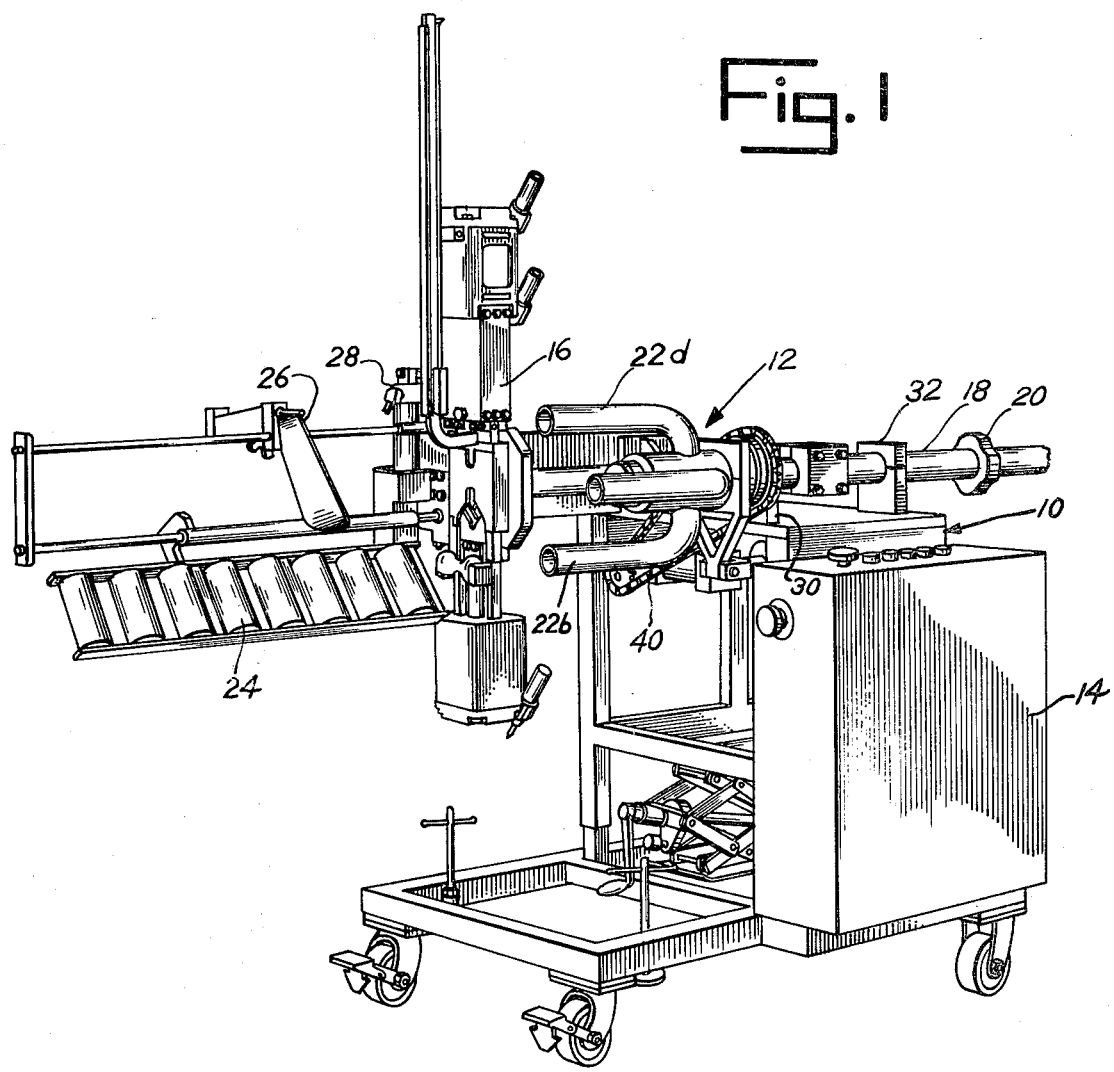
FIG. 1 is a perspective view of the improved stuffing horn assembly of the present invention in combination with a clipper apparatus.
Figure 2:
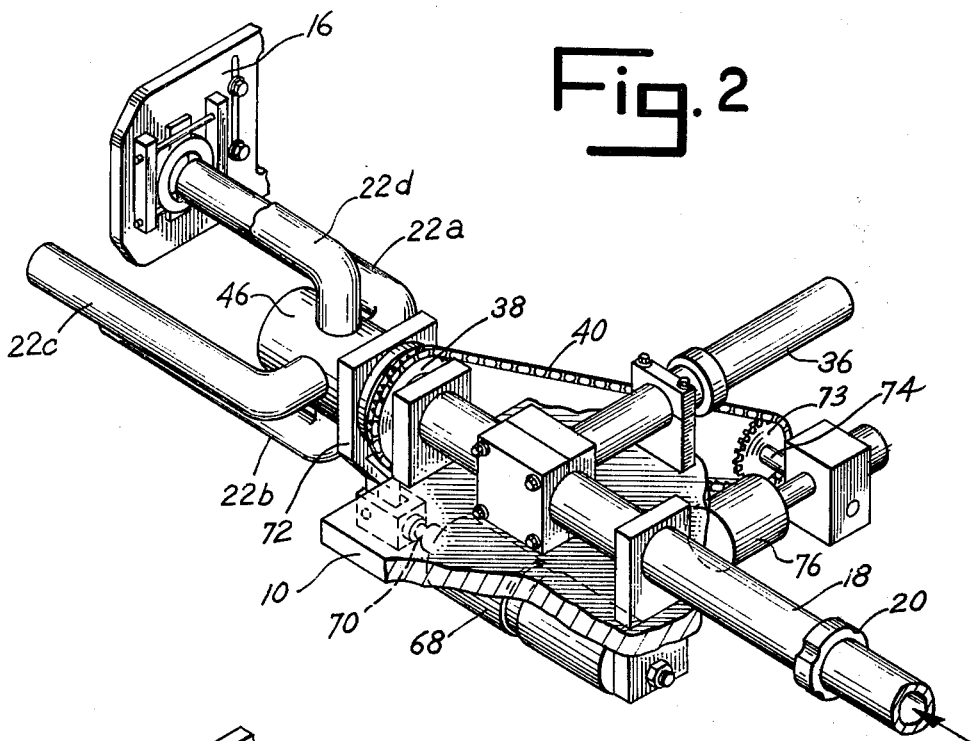
FIG. 2 is an enlarged, partial perspective view of the stuffing horn assembly wherein the assembly is in the retracted position.
Figure 3:
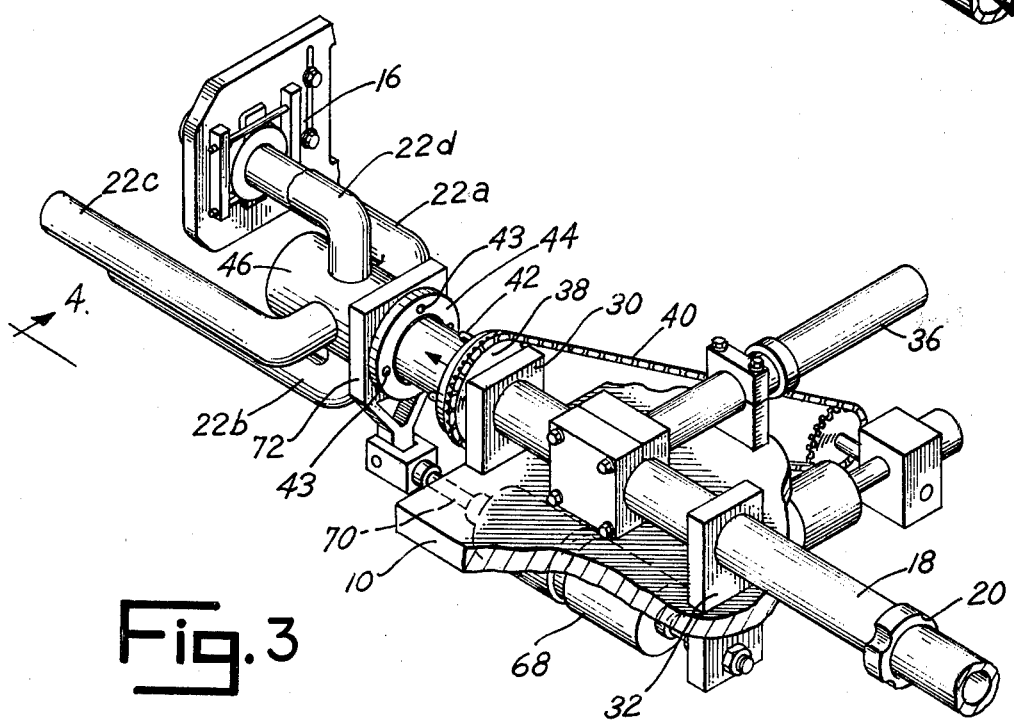
FIG. 3 is an enlarged, partial perspective view of the stuffing horn assembly wherein the assembly is in the extended position.
Figure 4:
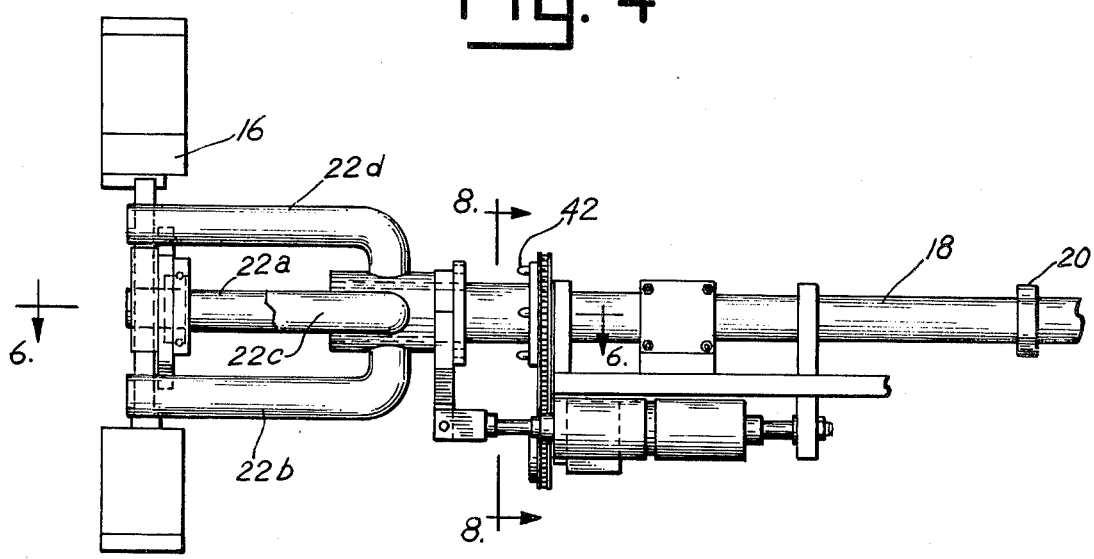
FIG. 4 is a partial side elevation of the stuffing horn assembly of the present invention.
Figure 5:
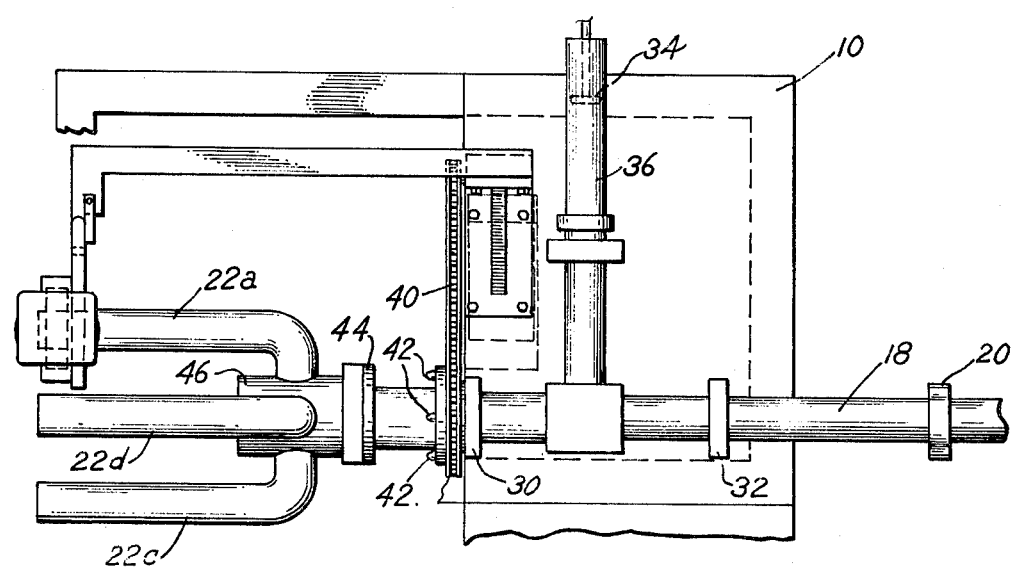
FIG. 5 is a top plan view of the assembly of FIG. 4.

FIG. 1 is a perspective view of the total improved stuffing horn assembly of the present invention. The assembly includes, in general, a mounting structure 10 with the stuffing horn assembly 12 attached thereto. A control box 14 is provided for controlling the sequential operation of the assembly 12 and a clipper mechanism 16.

In operation, a manifold tube 18 is coupled by means of coupler 20 to a sausage machine (not shown). Sausage flows through the manifold tube 18 into one branch tube 22 where it is discharged into sheared casing (not shown) on the branch tube 22. The branch tube 22 is positioned with respect to the clipper mechanism 16 so that upon filling of casing material and operation of the clipper 16, a finished sausage is positioned on a discharge tray 24. A limit switch 26 as well as a tray dump cylinder 28 control the size and movement of the finished sausage product. The present invention relates in particular to the structure and function of the stuffing horn assembly 12.

Referring therefore to FIGS. 2–8, the manifold tube 18 is generally cylindrical or annular and is rigidly attached by means of mounting blocks 30 and 32 to the mounting structure 10. Meat flows into the manifold tube 18 in the direction indicated by the arrow in FIG. 2. A meat pump piston 34 is positioned in a meat pump pressure control extension tube 36 connected to the manifold tube 18. Pressure control extension tube 36 and the associated meat pump piston 34 operate in the manner described in U.S. Pat. No. 4,023,238 which is incorporated herewith by reference.

A chain driven annular plate 38 is mounted for rotation in a bearing on tube 18 and may be rotated about the longitudinal axis of the tube 18 by operation of a drive chain 40. Pins 42 project from plate 38 and are adapted to engage with openings 43 defined in an end plate 44 attached to a concentric outer tube 46.

Concentric outer tube 46 is slidably and rotatably mounted on the manifold tube 18. A tube bearing 48 is interposed between outer tube 46 and inner tube 18. Bearing 48 may be made of bronze, Teflon or any similar material to seal the movable surfaces between the outer tube 46 and inner tube 18. Thus, the bearing 48 is attached to outer tube 46 and rotates over the inner tube 18.

Four branch tubes 22a, 22b, 22c and 22d connect with and define a passage through the outer tube 46 and bearing 48. Each branch tube 22 includes a transverse run 54 projecting radially from tube 46 smoothly connected with a longitudinal run 56 extending generally parallel to the longitudinal axis of the tube 46. Dimensionally, each of the branch tubes 22 is identical. Branch tubes 22a–22d are attached to outer tube 46 at 90° intervals in a plane transverse to the axis of the outer tube 46. In this manner, the discharge ends 58 of the branch tubes 22a–22d lie in a common plane at a fixed distance from the plate 38.

Manifold tube 18 includes a single radial passage or opening 60 adjacent the end of the inner tube 18. The end of the inner tube 18 is plugged by plug 62 which has an inclined surface 64 for smoothly directing material within the tube 18. A clipper and casing brake mechanism 16 is attached to the mounting structure 10 and aligned with one of the four branch tubes 22a–22d. Sheared casing (not shown) is positioned on the tube 22. Sausage material then flows into the tube 18 through passage 60 into the branch tube 22 and thence into the casing. The clipper 16 then operates to seal the end of the casing. Clipper 16 is a clipper as disclosed in Tipper U.S. Pat. No. 3,377,692, Double Acting Clipper with Gathering Means, which is incorporated herewith by reference. The brake mechanism is described in U.S. Pat. No. 4,023,238 previously referenced.

Attached to the mounting structure 10 is a pneumatic cylinder 68 having an output drive shaft 70. Shaft 70 is attached to yoke 72 which, in turn, is affixed to the outer tube 46. Cylinder 68 is operated to extend the shaft or rod 70 and thus drive the outer tube 46 to the extended position during a sausage filling operation. Note that the yoke 72 is attached to the outer tube 46 by means of a bearing which permits rotation of the outer tube 46 and branch tubes 22 with respect to the yoke 72. Yoke 72 thus imparts longitudinal movement to the outer tube 46.

The cylinder 68 is operated to retract the shaft 70 and thus the outer tube 46 so as to cause engagement of pins 42 with appropriate openings 43 in plate 44 during a non-filling sequence of the sausage stuffing apparatus. In such event, the outer tube 46 is locked to the drive plate 38. The drive plate 38 may then be rotated by operation of chain drive 40. Drive chain 40 is rotated in response to movement of spur gear 73 mounted on a shaft 74. Shaft 74 is driven by operation of a pneumatic cylinder 76. Operating cylinder 76 advances the plate 38 one incremental step at a time and thereby indexes branch horns 22 with respect to clipper assembly 16. Note that such indexing occurs only when the outer tube 46 is retained in the retracted position as a result of operation cylinder 68. Note also that such indexing requires a 90° rotation of the outer tube 46.

When the plate 44 is separated from pins 42 by operation of cylinder 68, key bars 78 projecting from the inner tube 18, engage slots 80 defined in the outer tube and bearing 48 as shown in FIG. 7 to maintain the outer tube 46 non-rotatable with respect to the inner tube 18. By contrast when the outer tube 46 is in the retracted position, the key bars 78 fit within an internal circumferential slot 82 to permit rotation of the outer tube 46. Any one of four branch horns 22 may thus be oriented at the proper rotational position with respect to clipper mechanism 16.

While there has been set forth a preferred embodiment of the invention, it is to be understood that the invention is to be limited only by the following claims and their equivalents.

What is claimed is:

1. An improved stuffing horn assembly for transporting and discharging comminuted products into a casing and for use in combination with a casing clipper and means for pumping said products through the horn assembly into the casing, said horn assembly, comprising, in combination:

a mounting structure;
   an inner manifold tube with a center passage open at one end and a lateral discharge opening toward the opposite end, said manifold tube being mounted on the mounting structure;
   means for connecting the open end with a product source;
   an outer tube slidably mounted on the manifold tube and concentric therewith, said outer tube also being rotatable with respect to the manifold tube;
   at least two branch tubes projecting from the outer tube and defining a passage through the outer tube and a product discharge opening for each branch tube;
   means for rotating the outer tube on the manifold tube to any one of a plurality of indexed positions aligning a passage through one branch tube with the lateral discharge opening of the manifold tube; and
   means for slidably positioning the outer tube on the manifold tube to any one of a number of indexed positions including a position aligning a passage through one branch tube with the lateral discharge opening.

2. The improved assembly of claim 1 wherein each branch tube has a lateral run generally transverse to the outer tube and a connected longitudinal run generally parallel to the outer tube with the discharge end of every tube capable of being indexed to a fixed spacial position by operation of said means for rotating and means for slidably positioning the outer tube.

3. The improved assembly of claim 1 including clipper means and means for maintaining casing on a tube, said clipper means cooperative with filled casing from a branch tube.

4. The improved assembly of claim 1 wherein said means for rotating the outer tube comprises an annular gear mounted on the inner tube for rotation around the inner tube and including projecting locking pins for engaging the outer tube for cooperative rotation therewith.

5. The assembly of claim 1 wherein said means for slidably positioning the outer tube comprises a yoke member attached to said outer tube and cylinder drive means attached between said yoke member and the mounting structure for positioning the yoke member and attached outer tube longitudinally with respect to the inner tube.

6. The assembly of claim 1 comprising four equi-spaced branch tubes at intervals of 90° about the circumference of the outer tube.

7. The assembly of claim 1 wherein the manifold tube includes a shaped product passage adjacent the lateral discharge opening for smoothly directing products through said opening.

8. The assembly of claim 1 in combination with means for pumping said product, said means for pumping connected to said manifold tube.

9. The improved assembly of claim 1 including means for keying the inner tube to the outer tube whenever said outer tube is positioned in a product discharge indexed position.

10. The improved assembly of claim 9 wherein said means for keying comprises key members projecting from said outer tube into slots in the inner tube upon the proper longitudinal and rotational positioning of the outer tube with respect to the inner tube.

* * * * *